A. E. PARNACOTT.
CYCLE CAR.
APPLICATION FILED MAY 23, 1913.
1,094,094.
Patented Apr. 21, 1914.
2 SHEETS—SHEET 2.
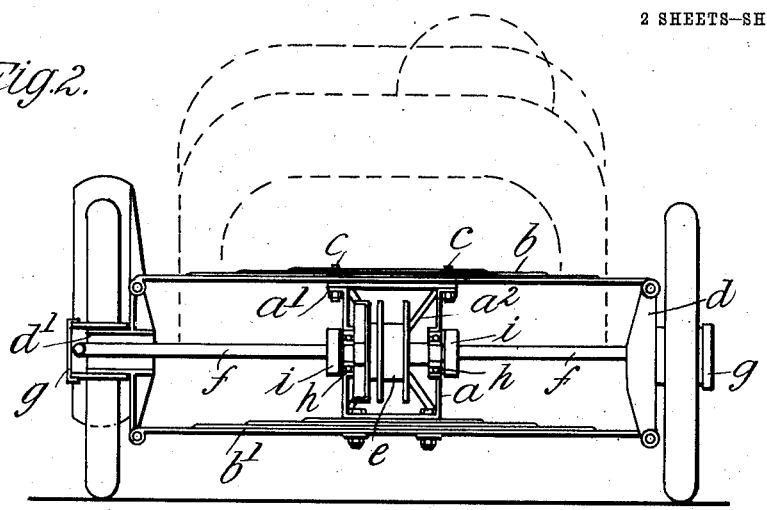
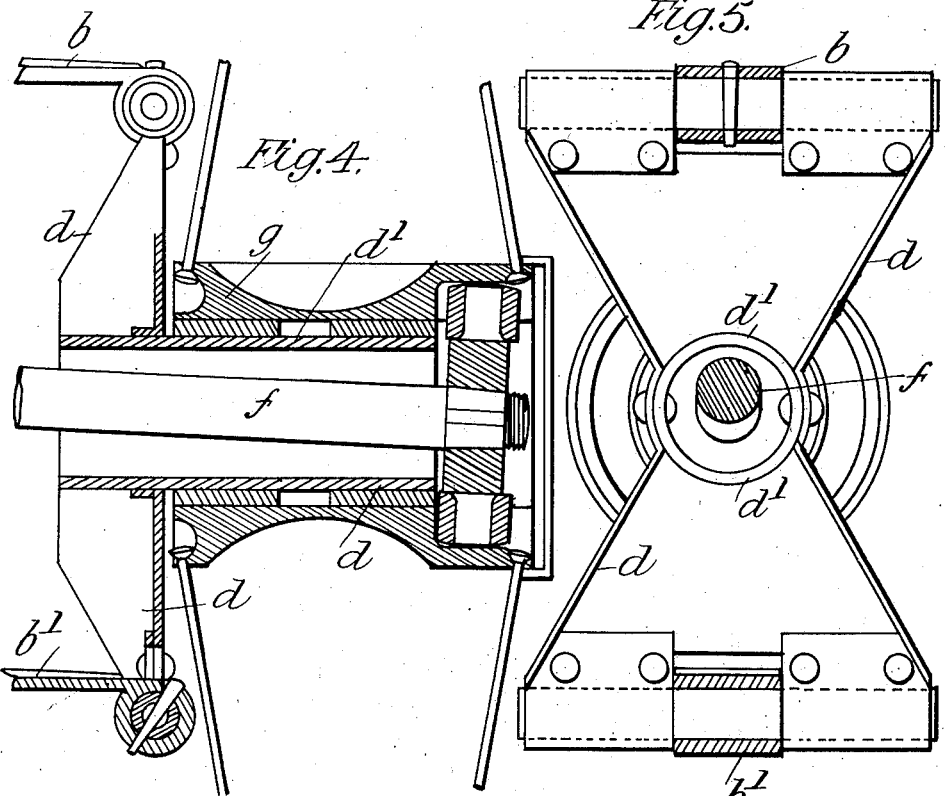
WITNESSES.
INVENTOR
A. E. Parnacott,
By his Attorneys
H. B. Willson & Co.

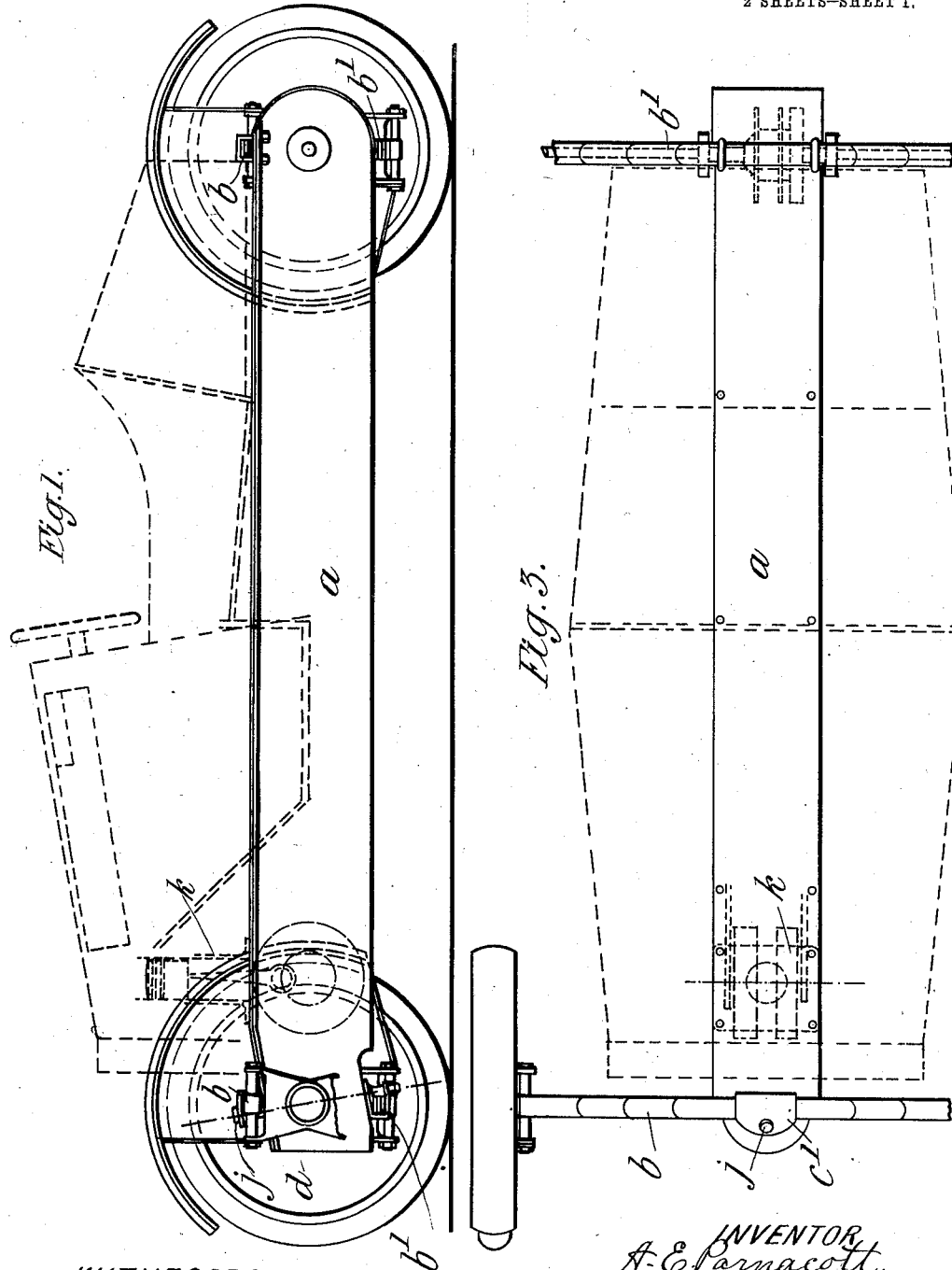

UNITED STATES PATENT OFFICE.

ALFRED E. PARNACOTT, OF PENGE, LONDON, ENGLAND.

CYCLE-CAR.

1,094,094. Specification of Letters Patent. Patented Apr. 21, 1914.

Application filed May 23, 1913. Serial No. 769,389.

*To all whom it may concern:*

Be it known that I, ALFRED EDMUND PARNACOTT, of Penge Lane, Penge, in the county of London, Kingdom of England, have invented certain new and useful Improvements in Cycle-Cars, of which the following is a specification.

This invention relates to motor road vehicles particularly of the cycle car type and to light strong tradesmen's delivery vans or other vehicles where lightness and strength combined are of importance.

The objects of the invention are to eliminate all unnecessary dead weight on the road wheels, to avoid those lateral stresses so destructive to tires which are set up by the unevenness of the road surface, and the natural tendency of all masses to oscillate about their centers to provide a spring suspension that shall insure easy running and enable solid tires to be adapted where desired without setting up undue vibration in or shortening the life of the mechanism and generally to simplify the construction and to provide a cheap and thoroughly reliable car.

Now according to this invention the main frame of the car consists of a centrally disposed longitudinal hollow frame or structure which extends the full distance between the axles and incloses the differential change gear and transmission from the change gear to the differential besides supporting the engine body and other parts of the car. Attached to each end of the hollow frame are an upper and lower transverse spring, one at the bottom and the other at the top. The free ends of the rear springs are connected by T pieces on the horizontal arms of which are mounted to revolve the rear wheels, but in such a manner as to maintain the wheels parallel in plan. The wheels are driven from the differential by universally jointed shafts passing betwen the two springs and through the horizontal arms. For the front wheels the T pieces are mounted between the ends of the springs which are mounted to rotate on an inclined pivot. The engine is mounted transversely to the car, and is geared through a clutch and chain gear to a cross counter shaft.

My invention is more particularly described hereinafter with reference to the accompanying drawings, in which:—

Figures 1 and 2 are side and rear end elevation respectively of a cycle car constructed according to this invention, the body being indicated by broken lines, and Fig. 3 is a part plan view thereof. Figs. 4 and 5 are detail views showing the connections of the springs to the axles of the wheels.

The central hollow frame $a$ may be made of wood, but is preferably as shown, pressed out of sheet metal, the main portion consisting of a trough-like structure formed from a single sheet, the top edges being flanged as shown at $a^1$ to facilitate the fixing thereto of the floor, body, engine, springs and other parts, and to stiffen this part of the frame which is subjected to compression stresses. Further the frame is braced at both ends, a suitable plate being inserted for that purpose in the forward end, and tie rods $a^2$ in the rear end. At opposite ends of the hollow frame $a$ upper and lower springs $b$ $b^1$ are fixed, the rear springs being held by clips $c$ which are passed through holes in the flanges $a^1$ and secured by nuts, short bedding plates being interposed between the springs $b$ $b^1$ and frame $a$. At the rear the springs are connected by the T pieces or spiders $d$ whose horizontal arms $d^1$ are hollow and form journals upon which the rear wheels are mounted to rotate being driven from the differential $e$ through universally jointed shafts $f$ which extend through the journals $d^1$ and are connected by universal joints with the wheel hubs or caps $g$. The hub is pressed out of sheet metal to form the part for the universal joint and the wheel is secured to the journal on the spider by the end of the cardan. It will be seen that ball bearings $h$ are provided in the frame $a$ between the universal joints $i$ and the differential casing.

In the front of the frame the springs are embraced by swiveling clips $c^1$ which are shown mounted to rotate on an inclined pivot $j$ which forms the steering pivot for the front wheels. These wheels are mounted to revolve on T pieces or spiders $d^1$ fixed to the ends of the springs. The spiders may be pressed out of sheet metal.

The engine cylinder $k$ indicated conventionally in the drawings is bolted directly to the frame $a$ the fly wheel, clutches, chains or other connections to the differential gear being housed in the hollow frame $a$ to the interior of which access is afforded by removable covers.

It will be seen that the provision of a central hollow frame inclosing the transmission mechanism and which can be cheaply pressed to shape in dies avoids fitting, alining and such costs. The pairs of transverse springs in effect form with their end fittings approximate parallelograms which insure independence of movement to the wheels, that is to say one wheel dropping into a depression does not lift its fellow, nor dash it immediately after on the ground, with the consequent variation of the tire diameter accompanied by a lateral movement of the tire on the road. It will also be evident that the arrangement of the cardan shafts passing freely through the hollow journals to the road wheels gives greater length of shaft, and therefore less angularity than in known constructions, and avoids a separate bearing.

What I claim and desire to secure by Letters Patent, is—

1. In a motor vehicle, a central hollow longitudinally extending frame, transmission mechanism inclosed in said frame, a pair of vertically spaced parallel springs arranged transversely of the vehicle and secured to each end of said frame, fittings connecting the ends of each pair of springs, said fittings each having hollow journals extending laterally outward therefrom, wheels rotatably mounted on said journals, Cardan shafts connected with said transmission mechanism and passing through said hollow journals and universal joints connecting the free ends of said shafts with the outer ends of the wheel hubs.

2. In a motor vehicle having wheels, the combination of a supporting frame, springs and fittings connected to form parallelograms secured to said frame, said parallelograms having hollow journals extending outwardly from their opposite ends on which said wheels are mounted to rotate, Cardan shafts extending through said journals and universal joints connecting said shafts with said wheels.

3. In a motor vehicle, the combination of a supporting frame, parallelograms secured to said frame and comprising pairs of spaced transversely arranged springs, T-shaped fittings the heads of which connect the ends of said springs, the stems of said fittings being hollow and extending laterally outward, wheels mounted to rotate on said hollow stems, Cardan shafts extending through said stems and connected by universal joints with said wheel hubs and means for driving said shafts.

4. In a motor vehicle, the combination of a pair of vertically spaced parallel springs arranged transversely at one end of said vehicle, means connecting said springs midway their length for holding them in spaced relation, T-shaped fittings pivotally connected with the ends of said springs and having their stems extending laterally outward, said stems being hollow to form journals, driving wheels carried by said journals, Cardan shafts connected to drive said wheels, said shafts having universal joint connections with said wheels.

In testimony whereof I have affixed my signature, in presence of two witnesses.

ALFRED E. PARNACOTT.

Witnesses:
 JOHN W. MACKENZIE,
 WALTER CHOWLES.